US006863713B1

(12) United States Patent
Ghosal et al.

(10) Patent No.: US 6,863,713 B1
(45) Date of Patent: Mar. 8, 2005

(54) METHOD TO ADSORB AN ADSORBATE USING MODIFIED CARBONACEOUS MATERIAL

(75) Inventors: Ranjan Ghosal, Albuquerque, NM (US); James A. Belmont, Acton, MA (US); Douglas M. Smith, Albuquerque, NM (US); Jameel Menashi, Lexington, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/475,385

(22) Filed: Dec. 30, 1999

Related U.S. Application Data

(62) Division of application No. 08/663,709, filed on Jun. 14, 1996, now abandoned.

(51) Int. Cl.$^7$ .............................................. B01D 53/04
(52) U.S. Cl. ............................. 95/117; 95/127; 95/128; 95/136; 95/138; 95/139; 95/143
(58) Field of Search ................................. 502/416, 417, 502/418; 210/689, 694; 95/116, 117, 127, 128, 136, 138, 139, 143, 900, 901, 903; 55/524

(56) References Cited

U.S. PATENT DOCUMENTS

| | | | |
|---|---|---|---|
| 1,999,573 A | 4/1935 | Odell | |
| 2,121,535 A | 6/1938 | Amon | |
| 2,156,591 A | 5/1939 | Jacobson | |
| 2,375,795 A | 5/1945 | Krejci | |
| 2,502,254 A | 3/1950 | Glassman | |
| 2,514,236 A | 7/1950 | Glassman | |
| 2,564,700 A | 8/1951 | Krejci | |
| 2,625,492 A | 1/1953 | Young | |
| 2,632,713 A | 3/1953 | Krejci | |
| 2,793,100 A | 5/1957 | Weihe | |
| 2,833,736 A | 5/1958 | Glaser | |
| 2,867,540 A | 1/1959 | Harris | |
| 2,891,595 A | 6/1959 | Kuntz et al. | |
| 3,011,902 A | 12/1961 | Jordon | |
| 3,025,259 A | 3/1962 | Wason et al. | |

(List continued on next page.)

FOREIGN PATENT DOCUMENTS

| DE | 24 26 266 A1 | 12/1975 |
|---|---|---|
| DE | 3170748 | 7/1985 |
| DE | 35 02 494 A1 | 8/1985 |
| DE | 10024312 A1 | 7/2001 |
| EP | 0 006 190 A1 | 1/1980 |
| EP | 272127 | 6/1988 |
| EP | 0300448 A2 | 1/1989 |
| EP | 0 411 160 A1 | 2/1991 |
| EP | 433229 | 6/1991 |
| EP | 0 441 987 A2 | 8/1991 |
| EP | 0 501 227 A1 | 9/1992 |
| EP | 410152 | 2/1994 |
| EP | 0635301 A2 | 1/1995 |
| EP | 636591 | 2/1995 |
| EP | 0 641 823 A1 | 3/1995 |
| EP | 0 646 621 A1 | 4/1995 |
| EP | 0 711 805 A1 | 5/1996 |
| FR | E 72775 | 4/1960 |
| FR | 1164786 | 4/1960 |
| FR | 1215895 | 4/1960 |
| FR | 1224131 | 6/1960 |
| FR | 1331889 | 5/1963 |
| FR | 2477593 | 11/1981 |
| FR | 2564489 | 10/1986 |
| FR | 2607528 | 6/1988 |
| GB | 862018 | 3/1961 |
| GB | 1139620 | 1/1969 |
| GB | 1191872 | 5/1970 |
| GB | 1363428 | 8/1974 |
| GB | 2044741 A | 10/1980 |
| JP | 58041351 | 3/1983 |
| JP | 59/82467 | 5/1984 |
| JP | 01/275666 | 11/1989 |
| JP | 002193066 | 7/1990 |
| JP | 04346830 | 12/1992 |
| JP | 5-178604 | 7/1993 |
| JP | 04092114 A * | 10/1993 |
| JP | 05/271365 | 10/1993 |
| JP | 5339516 | 12/1993 |
| JP | 6025572 | 2/1994 |
| JP | 06/025572 | 2/1994 |
| JP | 6067421 | 3/1994 |
| JP | 6073235 | 3/1994 |
| JP | 7-30269 | 4/1995 |
| WO | WO 91/04095 | 4/1991 |
| WO | WO 91/15425 | 10/1991 |
| WO | WO 92/13983 | 8/1992 |
| WO | WO 95/01838 | 1/1995 |
| WO | WO 96/18456 | 6/1996 |
| WO | WO 97/47382 | 12/1997 |

OTHER PUBLICATIONS

International Search Report for International Application No. PCT/US01/27347.

English Abstract of JP Patent Publication No. 56078629, dated Jun. 27, 1981, "Basic Malodorous Component Capturing Agent".

Derwent Abstract, AN No. 80–03330C, "Sulphonated Carbon Pigment Production by Treating Technical Grade Carbon with Hot Aqueous Acid," SU,A,659,523, Apr. 1979.

Derwent Abstract, AN No. 82–28019E, "Penetrating Flexographic Print Ink Based Polyacrylic Resin," Oct. 17, 1979, SU,A, 834062.

(List continued on next page.)

Primary Examiner—Frank M. Lawrence

(57) ABSTRACT

An adsorbent composition containing a modified carbonaceous material capable of adsorbing an adsorbate is disclosed, wherein at least one organic group is attached to the carbonaceous material. Furthermore, methods to increase the adsorption capacity of a carbonaceous material capable of adsorbing an adsorbate and methods to adsorb an adsorbate using the above-described adsorbent composition are also disclosed.

17 Claims, 5 Drawing Sheets

U.S. PATENT DOCUMENTS

| | | |
|---|---|---|
| 3,043,708 A | 7/1962 | Watson et al. |
| 3,094,428 A | 6/1963 | Hamilton et al. |
| 3,203,819 A | 8/1965 | Steenken et al. |
| 3,317,458 A | 5/1967 | Clas et al. |
| 3,335,020 A | 8/1967 | Aboytes et al. |
| 3,390,006 A | 6/1968 | Takewell et al. |
| T860,001 I4 | 3/1969 | Gessler |
| 3,479,300 A | 11/1969 | Rivin et al. |
| 3,528,840 A | 9/1970 | Aboytes |
| 3,607,813 A | 9/1971 | Purcell et al. |
| 3,622,650 A | 11/1971 | Berstein et al. |
| 3,660,132 A | 5/1972 | Illigen et al. |
| 3,663,285 A | 5/1972 | Graf et al. |
| 3,674,670 A | 7/1972 | Erikson et al. |
| 3,686,111 A | 8/1972 | Makhlouf et al. |
| 3,689,452 A | 9/1972 | Burke, Jr. |
| 3,716,513 A | 2/1973 | Burke, Jr. |
| 3,846,141 A | 11/1974 | Ostergren et al. |
| 3,873,489 A | 3/1975 | Thurn et al. |
| 3,876,603 A | 4/1975 | Makhlouf |
| 3,960,771 A * | 6/1976 | Tanaka et al. |
| 3,997,356 A | 12/1976 | Thurn et al. |
| 4,003,751 A | 1/1977 | Carder |
| 4,006,031 A | 2/1977 | Ferch et al. |
| 4,014,833 A | 3/1977 | Story |
| 4,014,844 A | 3/1977 | Vidal et al. |
| 4,061,830 A | 12/1977 | Greenberg |
| 4,071,496 A | 1/1978 | Kraus et al. |
| 4,074,035 A | 2/1978 | Powers et al. |
| 4,108,679 A | 8/1978 | Szczepanik et al. |
| 4,176,361 A | 11/1979 | Kawada et al. |
| 4,204,871 A | 5/1980 | Johnson et al. |
| 4,204,876 A | 5/1980 | Bowden |
| 4,211,578 A | 7/1980 | Scott, IV |
| 4,229,333 A | 10/1980 | Wolff et al. |
| 4,265,768 A | 5/1981 | Beasley et al. ............ 210/682 |
| 4,290,072 A | 9/1981 | Mansukhani |
| 4,293,394 A | 10/1981 | Darlington et al. |
| 4,297,145 A | 10/1981 | Wolff et al. |
| 4,308,061 A | 12/1981 | Iwahashi et al. |
| 4,320,011 A | 3/1982 | Sato et al. ................. 210/694 |
| 4,328,041 A | 5/1982 | Wilson |
| 4,360,627 A | 11/1982 | Okado et al. |
| 4,442,256 A | 4/1984 | Miller |
| 4,451,597 A | 5/1984 | Victorius |
| 4,468,496 A | 8/1984 | Takeuchi et al. |
| 4,476,270 A | 10/1984 | Brasen et al. |
| 4,478,905 A | 10/1984 | Neely, Jr. |
| 4,503,174 A | 3/1985 | Vasta |
| 4,503,175 A | 3/1985 | Houze et al. |
| 4,517,335 A | 5/1985 | Wolff et al. |
| 4,525,521 A | 6/1985 | DenHartog et al. |
| 4,525,570 A | 6/1985 | Blum et al. |
| 4,528,281 A * | 7/1985 | Sutt, Jr. |
| 4,530,961 A | 7/1985 | Nguyen et al. |
| 4,544,687 A | 10/1985 | Schupp et al. |
| 4,555,535 A | 11/1985 | Bednarek et al. |
| 4,556,427 A | 12/1985 | Lewis |
| 4,590,052 A | 5/1986 | Chevallier et al. |
| 4,597,794 A | 7/1986 | Ohta et al. |
| 4,605,542 A | 8/1986 | Harada |
| 4,605,596 A | 8/1986 | Fry |
| 4,620,993 A | 11/1986 | Suss et al. |
| 4,620,994 A | 11/1986 | Suss et al. |
| 4,650,718 A | 3/1987 | Simpson et al. |
| 4,659,770 A | 4/1987 | Vasta |
| 4,665,128 A | 5/1987 | Cluff et al. |
| 4,670,059 A | 6/1987 | Hackleman et al. |
| 4,680,204 A | 7/1987 | Das et al. |
| 4,681,811 A | 7/1987 | Simpson et al. |
| 4,692,481 A | 9/1987 | Kelly |
| 4,702,749 A | 10/1987 | Sircar et al. |
| 4,710,543 A | 12/1987 | Chattha et al. |
| 4,713,427 A | 12/1987 | Chattha et al. |
| 4,719,132 A | 1/1988 | Porter, Jr. |
| 4,727,100 A | 2/1988 | Vasta |
| 4,741,780 A | 5/1988 | Atkinson |
| 4,752,532 A | 6/1988 | Starka |
| 4,764,430 A | 8/1988 | Blackburn et al. |
| 4,770,706 A | 9/1988 | Pietsch |
| 4,789,400 A | 12/1988 | Solodar et al. |
| 4,798,745 A | 1/1989 | Martz et al. |
| 4,798,746 A | 1/1989 | Claar et al. |
| 4,808,656 A | 2/1989 | Kania et al. |
| 4,820,751 A | 4/1989 | Takeshita et al. |
| 4,822,844 A | 4/1989 | Kawakami et al. |
| 4,824,900 A | 4/1989 | Sakurai |
| 4,831,011 A * | 5/1989 | Oikawa et al. |
| 4,840,674 A | 6/1989 | Schwarz |
| 4,853,037 A | 8/1989 | Johnson et al. |
| 4,866,131 A | 9/1989 | Fujimaki et al. |
| 4,883,838 A | 11/1989 | Jung et al. |
| 4,894,420 A | 1/1990 | Scriver |
| 4,908,397 A | 3/1990 | Barsotti et al. |
| 4,914,148 A | 4/1990 | Hille et al. |
| 4,927,868 A | 5/1990 | Schimmel et al. |
| 4,975,474 A | 12/1990 | Barsotti et al. |
| 4,994,520 A | 2/1991 | Mori et al. |
| 5,008,223 A | 4/1991 | Speer et al. |
| 5,008,335 A | 4/1991 | Pettit, Jr. |
| 5,017,435 A | 5/1991 | Barsotti et al. |
| 5,026,755 A | 6/1991 | Kveglis et al. |
| 5,051,464 A | 9/1991 | Johnson et al. |
| 5,064,719 A | 11/1991 | DenHartog et al. |
| 5,066,733 A | 11/1991 | Martz et al. |
| 5,076,843 A | 12/1991 | Acitelli et al. |
| 5,093,391 A | 3/1992 | Barsotti et al. |
| 5,093,407 A | 3/1992 | Komai et al. |
| 5,100,470 A | 3/1992 | Hindagolla et al. |
| 5,106,417 A | 4/1992 | Hauser et al. |
| 5,109,055 A | 4/1992 | Nagasaki et al. |
| 5,114,477 A | 5/1992 | Mort et al. |
| 5,122,552 A | 6/1992 | Johnson |
| 5,130,004 A | 7/1992 | Johnson et al. |
| 5,130,363 A | 7/1992 | Scholl et al. |
| 5,135,548 A * | 8/1992 | Golden et al. ............ 502/417 |
| 5,141,556 A | 8/1992 | Matrick |
| 5,152,801 A | 10/1992 | Altermatt et al. |
| 5,159,009 A | 10/1992 | Wolff et al. |
| 5,162,409 A | 11/1992 | Mroczkowski |
| 5,168,106 A | 12/1992 | Babcock et al. |
| 5,173,111 A | 12/1992 | Krishnan et al. |
| 5,179,191 A | 1/1993 | Jung et al. |
| 5,182,355 A | 1/1993 | Martz et al. |
| 5,184,148 A | 2/1993 | Suga et al. |
| 5,190,582 A | 3/1993 | Shinozuka et al. |
| 5,200,164 A | 4/1993 | Medalia et al. |
| 5,204,404 A | 4/1993 | Werner, Jr. et al. |
| 5,206,295 A | 4/1993 | Harper et al. |
| 5,221,581 A | 6/1993 | Palmer et al. |
| 5,227,425 A | 7/1993 | Rauline |
| 5,229,452 A | 7/1993 | Green et al. |
| 5,232,974 A | 8/1993 | Branan, Jr. et al. |
| 5,236,992 A | 8/1993 | Bush |
| 5,238,888 A * | 8/1993 | Abe |
| 5,242,751 A | 9/1993 | Hartman |
| 5,264,137 A | 11/1993 | McCullough, Jr. et al. . 210/767 |
| 5,266,361 A | 11/1993 | Schwarte et al. |
| 5,266,406 A | 11/1993 | DenHartog et al. |
| 5,276,097 A | 1/1994 | Hoffmann et al. |

| | | |
|---|---|---|
| 5,281,261 A | 1/1994 | Lin |
| 5,286,286 A | 2/1994 | Winnik et al. |
| 5,286,291 A | 2/1994 | Bernhardt et al. |
| 5,288,788 A | 2/1994 | Shieh et al. |
| 5,290,848 A | 3/1994 | Palmer et al. |
| 5,294,253 A | 3/1994 | Carlson et al. |
| 5,302,197 A | 4/1994 | Wickramanayke et al. |
| 5,310,778 A | 5/1994 | Shor et al. |
| 5,314,945 A | 5/1994 | Nickle et al. |
| 5,314,953 A | 5/1994 | Corcoran et al. |
| 5,319,044 A | 6/1994 | Jung et al. |
| 5,320,738 A | 6/1994 | Kaufman |
| 5,324,790 A | 6/1994 | Manring |
| 5,328,949 A | 7/1994 | Sandstrom |
| 5,334,650 A | 8/1994 | Serdiuk et al. |
| 5,336,716 A | 8/1994 | Kappes et al. |
| 5,336,730 A | 8/1994 | Sandstrom |
| 5,336,753 A | 8/1994 | Jung et al. |
| 5,352,289 A | 10/1994 | Weaver et al. |
| 5,356,973 A | 10/1994 | Taljan et al. |
| 5,366,828 A | 11/1994 | Struthers |
| 5,401,313 A | 3/1995 | Supplee et al. |
| 5,401,789 A | 3/1995 | Wolff et al. |
| 5,430,087 A | 7/1995 | Carlson et al. |
| 5,447,557 A * | 9/1995 | Golden et al. ............... 423/219 |
| 5,476,989 A | 12/1995 | Mimori et al. ................. 588/20 |
| 5,554,739 A * | 9/1996 | Belmont ...................... 534/553 |
| 5,559,169 A * | 9/1996 | Belmont et al. ............. 523/215 |
| 5,571,311 A * | 11/1996 | Belmont et al. ......... 106/31.28 |
| 5,575,845 A * | 11/1996 | Belmont et al. ............ 106/472 |
| 5,622,557 A * | 4/1997 | Mahmud et al. ............ 106/475 |
| 5,630,868 A * | 5/1997 | Belmont et al. ......... 106/31.26 |
| 5,707,922 A * | 1/1998 | Mimori et al. |
| 5,713,988 A * | 2/1998 | Belmont et al. ........... 106/31.6 |
| 5,807,494 A | 9/1998 | Boes et al. .................... 252/62 |
| 5,851,280 A * | 12/1998 | Belmont et al. ............ 106/472 |
| 5,877,238 A * | 3/1999 | Mahmud et al. ............ 523/212 |
| 5,916,934 A * | 6/1999 | Mahmud et al. ............ 523/215 |
| 5,935,436 A * | 8/1999 | Lee et al. ................. 210/257.1 |
| 5,972,826 A * | 10/1999 | Boes et al. ................. 502/174 |
| 6,107,350 A | 8/2000 | Boes et al. .................. 516/100 |
| 6,435,240 B1 | 8/2002 | Fagebaume et al. ........ 156/349 |

OTHER PUBLICATIONS

Derwent Abstract, AN No. 86–335147, "Wear Resistant Rubber Composition for Tire Tread Rubber," Apr. 30, 1985, JPA 61–250042, Nov. 198.

Derwent Abstract WPI Acc No. 94–031974/04, Japanese Patent Application No. 92145679, 1992.

Derwent Abstract WPI Acc No. 94–072121/09, Japanese Patent Application No. 9295517, 1992.

Derwent Abstract WPI Acc No. 94–121502/15, Japanese Patent Application No. 92241473, 1992.

Derwent Abstract WPI Acc No. 94–124167/15, Japanese Patent Application No. 9133147, 1991.

Derwent Abstract, AN No. 95–183086, "Tire Treated Rubber Composition," Oct. 21, 1993, JPA 07102116.

Derwent Abstract, AN No. 94–189154, "Ink for Writing Implements," May 10, 1994, JPA 61–28517A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel*, vol. 43, No. 4, pp. 289–298, 1964.

Roberts et al., *Basic Principles of Organic Chemistry*, Second Edition, W.A. Benjamin, Inc., Pub., p. 1080.

Allen, "Thermal Ink Jet Printing Trends and Advances," BIS Ink Jet Printing Conference, Oct. 10–12, 1994, Monterey, California.

Schneider, "Continuous Ink Jet," BIS Ink Jet Printing Conference, Oct. 10–12, 1994, Monterey, California.

Major, "Formulating the Future of Automotive Coatings," *Modern Paint and Coatings*, Jul. 1993.

Greenfield, "Fewer Formulation Options Lead to Emphasis on Familiar," *Modern Paint and Coatings*, Jul. 1992.

Schrantz, "Regulations and Competition Push Technological Change," *Modern Paint and Coatings*, Jul. 1994.

"Regulations Focus Formulator Attention on Additives," *Modern Paint and Coatings*, Jul. 1994.

*The Printing Ink Manual*, Fifth Edition, R.H. Leach et al., Blueprint Press, Chapters 8,9 and 10.

Tsubokawa, "Functionalization of Carbon Black by Surface Grafting of Polymers," *Polym. Sci.*, vol. 17, pp. 417–470, 1992.

Wolff et al., "The Influence of Modified Carbon Blacks on Viscoelastic Compound Properties," *Kautschuk & Gummi*, Kuststoffe 44, Jahrgang, Nr. 10/91.

Bourdillon et al., "Immobilization of Glucose Oxidase on a Carbon Surface Derivatized by Electrochemical Reduction of Diazonium Salts," *J. Electroanal. Chem.*, vol. 113–123, 1992.

Ohkita et al., "The Reaction of Carbon Black Surface with 2,2–Diphenyl–1–Picrylhydrazyl," *Carbon*, vol. 10, No. 5, pp. 631–636, 1972.

Watson, "Chemical Aspects of Reinforcement," Compounding Research Department, Dunlop Research Center, Dunlop Rubber Co., pp. 987–999.

Garten et al., "Nature of Chemisorptive Mechanisms in Rubber Reinforcement," Commonwealth Scientific and Industral Research Organ., Div. of Industrail Chem., Melbourne, Australia, pp. 596–609.

Donnet et al., "Chimie Superficielle et Sites Privilegies Des Charges Fines," Extrait de la Revue Generale du Caoutchoic, Jul. 1959.

*Ullmann's Encyclopedia of Industrial Chemistry*, Fifth Edition, vol. A–8, pp. 508–509, 1987.

Donnet et al., "Sur la Structure Aroxylique des Groupments Quinoniques et des Radicaux Libres Presentes en Surface des Noirs de Carbon," *Ref. Gen. Caoutchouc Plastiques*, vol. 42, No. 3, pp. 389–392, 1965 (with English Abstract).

Yamaguchi et al., "Novel Carbon Black/Rubber Coupling Agent," *Kautschuk & Gummi*, Kuntstoffe 42, Jahrgang, Nr. 5/89.

Studebaker et al., "Oxygen–Containing Groups on the Surface of Carbon Black," *Industrial and Engineering Chemistry*, vol. 48, No. 1, pp. 162–166, Jan. 1956.

Zoheldi et al., "Role of Oxygen Surface Groups in Catalysis of Hydrogasification of Carbon Black by Potassium Carbonate," *Carbon*, vol. 25, No. 6, pp. 809–819, 1987.

Scherrer, "Coloration of Ink Jet Inks," Presentation at BIS Ink Jet Printing Conference, Oct. 10–12, 1994, Monterey.

*Ink Jet Printing: 1994 Overview and Outlook*, Chapter 7.

*The Printing Ink Manual*, Fourth Edition, Chapter 2, Leach et al., Eds., 1988.

Andreottoia, *Ink Jet Ink Technology*, pp. 531–544.

Gregory, *High–Technology Applications of Organic Colorants*, Chapter 9, "Ink–Jet Printing," 1991.

PCT Search Report, PCT/US 95 16452, Apr. 17, 1996.

PCT Search Report, PCT/US 95/16195, Apr. 19, 1996.

PCT Search Report, PCT/US 95/16281, Apr. 26, 1996.

PCT Search Report, PCT/IB 95/01154, Apr. 29, 1996.
PCT Search Report, PCT/US 95/16453, May 15, 1996.
Chemical Abstract No. 113:116901, Nov. 6, 1989.
Chemical Abstract No. 120325954, Feb. 1, 1994.
RAPRA Abstract No. 432845, "Compounding Heat Resistant Non–Black EPDM Rubber Compounding Report," Dec. 1990.
RAPRA Abstract No. 417612, "Review: Polymer–Filter Interactions in Rubber Reinforcement," Oct. 1990.
RAPRA Abstract No. 403202, "Organotitanate, Zirconate Effect on Elastomers," Jun. 1990.
RAPRA Abstract No. 394030, "Mechanical Properties of Natural Rubbers/Grafted Cellulose Fibre Composites," 1990.
RAPRA Abstract No. 390600, "Application of Coupling Agents to Elastomers," 1989.
RAPRA Abstract No. 00388935, "Light Coulored Fillers in Polymers," Nov. 1989.
Dialog Abstract EMA No. 8602–C1–D–0297, "Carbon Black is Better With Silica," Oct. 1985.
RAPRA Abstract No. 00343229, "White and Black Fillers for Rubber Compounds," Dec. 1986.
RAPRA Abstract No. 00177481, "Ethylene–Propylene Rubbers," 1981.
RAPRA Abstract No. 00105623, "Putting Performance into Thermosets with Titanium Coupling Agents," Oct. 1976.
RAPRA Abstact No. 00056893, "Applications for Silane Coupling Agents in the Automotive Industry," Oct. 1975.
RAPRA Abstract No. 00002608, "Ground Rice Hull Ash as a Filler for Rubber," Oct. 1974.
RAPRA Abstract No. 00000937, "Reduction of Heat Build–up in Mineral–Filled Elastomers Through the Use of Silane Coupling Agents," May 1973.
RAPRA Abstract No. 00105623, "Putting Performance into Thermosets With Titanium Coupling Agents," Oct. 1976.
Derwent Abstract, Japanese Patent Publication No. 80–73657, Mar. 19, 1996.
Derwent Abstract, WPI Acc No. 78–73373A/41, Japanese Patent Application No. 53–100190, 1978.
Derwent Abstract, WPI Acc No. 95–019436/03, Japanese Patent Application No. 63–06289, 1994.
Derwent Abstract, WPI Acc No. 92–369382/45, Japanese Patent Application No. 4–270199, 1992.
Derwent Abstract, WPI Acc No. 90–335599/45, DD No. 279537, 1990.
Derwent Abstract, WPI Acc No. 90–128540/17, Japanese Patent Application No. 2–077483, 1990.
Derwent Abstract, WPI Acc No. 88–261546/37, Japanese Patent Application No. 63–190800, 1988.
Derwent Abstract, WPI Acc No. 87–034097/05, Japanese Patent Application No. 61–291659, 1986.
Derwent Abstract, WPI Acc No. 88–052867/08, Japanese Patent Application No. 63–008442, 1988.
Chemical Abstract vol. 114, No. 14, Number 124715d (1990).
Chemical Abstract vol. 112, No. 18, Number 160248w, 1988.
Chemical Abstract vol. 110, No. 6, Number 48370n, 1986.
Chemical Abstract vol. 69, No. 18, Number 68396p, 1967.
Chemical Abstract vol. 94, No. 16, Number 122906m, 1980.
Chemical Abstract vol. 66, No. 24, Number 105491b, 1966.
Chemical Abstract vol. 67, No. 2, Number 3806m, 1966.
Chemical Abstract vol. 102, No. 4, Number 28447z, 1984.
Chemical Abstract vol. 100, No. 22, Number 176125s, 1983.
Chemical Abstract vol. 106, No. 28, Number 224473b, 1987.
Chemical Abstract vol. 94, No. 8, Number 48630y, 1980.
Chemical Abstract vol. 88, No. 22, Number 161466p, 1978.
Chemical Abstract vol. 104, No. 12, Number 90590k, 1985.
Chemical Abstract vol. 105, No. 8, Number 61488y, 1985.
Ouyang et al., "Carbon Black Effects on Treadwear," Presented at a Meeting of the Rubber Division, American Chemical Society, Las Vegas, Nevada, May 29–Jun. 1, 1990.
Agostini, et al., "New Compound Technology," Goodyear Technical Center, Luxembourg.
Dialog Abstract of Japanese Application No. 4–362009, 1992.
Dialog Abstract of Japanese Application No. 4–276000, 1992.
Studebaker et al., "The Rubber Compound and its Composition," *Science and Technology of Rubber*, Academic Press, 1978, Chapter 9, pp. 367–375.
"Tires," Reprinted from *Encyclopedia of Polymer Science and Engineering*, vol. 16, Second Edition, 1969, pp. 834–861.
Tsubokawa et al., "Grafting Onto Carbon Black Having Few Functional Groups," Shikizai Kyokaisha, vol. 66, No. 5 (1993), Abstract Only.
J.B. Donnet et al., "Radical Reactions and Surface Chemistry of Carbon Black," Bull. Soc. Chim. 1960 (Abstract Only).
Concise Encyclopedia of Polymer Science and Engineering, Wiley, 1990, pp. 104–105.
Carbon (Carbon Black) Reprinted from Kirk–Othmer: Encyclopedia of Chemical Technology, vol. 4, Third Edition, pp. 631–643, 1978.
Delamar et al., J. Am. Chem. Soc. 1992, 114, 5883–5884.
Kang, "Water–Based Ink–Jet Ink," J. Imaging Science, vol. 35, No. 3, May/Jun. 1991, pp. 195–201.
Sircar et al., "Activated Carbon For Gas Separation and Storage," *Carbon*, vol. 34, No. 1, pp. 1–12, 1996.
Golden et al., "Activated Carbon Adsorbent for PSA Driers," *Carbon*, vol. 28, No. 5, pp. 683–690, 1990.
Mahajan et al., "Surface–Modified Carbons for the Drying of Gas Streams," *Separation Science and Technology*, 17(8), pp. 1019–1025, 1982.

* cited by examiner

METHOD TO ADSORB AN ADSORBATE USING MODIFIED CARBONACEOUS MATERIAL

The present application is a divisional application of U.S. patent application Ser. No. 08/663,709 filed Jun. 14, 1996, now abandoned.

FIELD OF THE INVENTION

This invention relates to carbon adsorbents made from modified carbonaceous materials and also relates to a method of using these adsorbents, including a method to increase the adsorption capacity and/or alter the adsorption affinity of carbonaceous materials capable of adsorbing an adsorbate.

BACKGROUND OF THE INVENTION

Adsorption is an important operation in many industrial processes. The effectiveness of an adsorbent depends, primarily, on its surface area, pore structure, and surface chemistry. The nature of the adsorbate which is to be adsorbed frequently dictates the chemical nature of the adsorbent. For example, carbonaceous adsorbents are often used to selectively remove organic compounds from liquid, gaseous, or vapor media. Silica and alumina based adsorbents are employed to selectively adsorb polar adsorbates such as water, ammonia, and the like from similar media.

The efficacy of an adsorbent for a particular application is usually determined by the adsorption capacity and selectivity of the adsorbent for the adsorbate in question. The adsorption capacity may be measured per unit mass or per unit volume of the adsorbent. In general, the higher the adsorption capacity and selectivity of an adsorbent for a particular adsorbate, the more useful it is, since less of the adsorbent has to be used to effect the same removal of the adsorbate.

Carbonaceous materials, such as activated carbon, carbon black, and the like, represent an important class of adsorbents which are used in many fields such as separation, purification, and waste treatment, among others. Because of their widespread use, any method for improving the adsorption properties of carbonaceous adsorbents for a particular adsorbate can have a large impact on the efficacy and economy of the processes utilizing them. Therefore, attempts have been made in the past to modify the surface chemistry of carbonaceous adsorbents. The methods employed for their modification can be broadly classified into physical and chemical means. In surface modification by physical means, a species is deposited on the surface of the carbonaceous adsorbent to form a layer which then changes its adsorption properties. However, such modification techniques have limited utility because the deposited layer is easily removed. In surface modification by chemical means, the modifying species is attached to the carbon surface by a chemical bonding mechanism.

The characteristics of the adsorption isotherm, representing the relationship between the extent of adsorption and adsorbate concentration or adsorbate partial pressure at a fixed temperature, is also of importance. As described by Sircar et al. in "Activated Carbon for Gas Separation and Storage," *Carbon*, Vol. 34, No. 1, pp. 1–12 (1996), the characteristics of the preferred adsorption isotherm will depend on the separation process being employed. For example, in cases where adsorbent regeneration is effected by a pressure swing, the preferred adsorbent is one with a moderate affinity for the adsorbate. When the adsorbate is strongly adsorbed, that is, when it has a strong affinity for the adsorbent, regeneration becomes difficult and energy intensive. On the other hand, when the adsorbent exhibits a weak affinity for the adsorbate, it has a small adsorption capacity at low adsorbent partial pressures and, hence, the adsorption mass transfer zone becomes very long. Thus, the availability of a method for altering the affinity of an adsorbent for an adsorbate is advantageous.

Thus, any method for increasing the adsorption capacity and/or modifying the adsorption affinity of the adsorbent enhances its usefulness in adsorption applications. As already noted, chemical modification can be used to alter the adsorptive properties of carbonaceous adsorbents. The range of chemical species which can be attached, however, is limited.

Bansal, Donnet and Stoeckli (in Chapter 5 of *Active Carbon*, Marcel Dekker, Inc., 1988) have reviewed different techniques of carbon surface modification. Physical impregnation methods are described, as are methods that rely on chemical reactions with various species to modify the surface of the carbon. Some of the chemical surface modification techniques described by Bansal et al. are oxidation, halogenation, sulfonation, and ammoniation. Several of these techniques require treatment of the carbon at elevated temperatures. Another technique involving oxidation of the carbon with $HNO_3$ in the presence of a catalyst, has been described by Sircar and Golden (U.S. Pat. No. 4,702,749). However, these techniques have certain disadvantages apparent to those familiar with the field.

In view of the limited utility of chemical means of modifying the surfaces of carbonaceous adsorbents, there still is a need to develop modified carbon adsorbents, preferably with improved adsorption capacity over the unmodified material.

SUMMARY OF THE INVENTION

To achieve these and other advantages and in accordance with the purposes of the present invention, as embodied and broadly described herein, the present invention relates to an adsorbent composition containing a modified carbonaceous material capable of adsorbing an adsorbate.

Another embodiment of the present invention relates to a method to increase the adsorption capacity of a carbonaceous material capable of adsorbing an adsorbate or altering the adsorption isotherm of the adsorbate on the adsorbent, for instance, to allow an easier regeneration of the adsorbent. In his method, at least one organic group capable of increasing the adsorption capacity of a carbonaceous material is attached to the carbonaceous material.

The present invention, in addition, relates to a method of adsorbing an adsorbate and includes the step of contacting the adsorbate with a carbonaceous material which has been modified by attaching an organic group. The modified carbonaceous material is capable of adsorbing the adsorbate and at least one organic group is attached to the carbonaceous material.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description and appended claims.

It is to be understood that both the foregoing general description and the following detailed description are exemplary and explanatory only and are intended to provide further explanation of the present invention, as claimed.

The accompanying figures, which are incorporated in and constitute a part of this specification, illustrate several embodiments of the present invention and together with the description, serve to explain the principles of the present invention.

DETAILED DESCRIPTION OF THE PRESENT INVENTION

Figure 1:
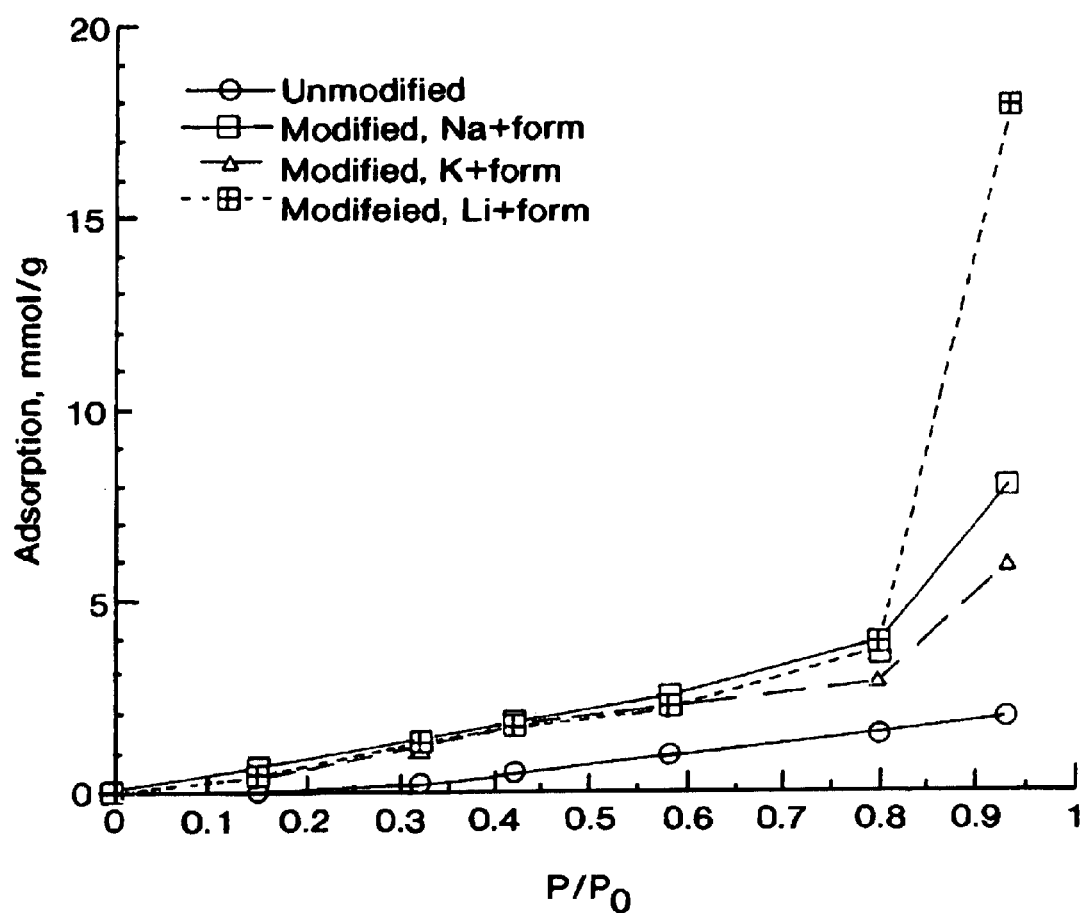
FIG. 1 is a graph plotting the amount of water adsorption on modified and unmodified carbon black.

In further detail, an adsorbent composition of the present invention contains a modified carbonaceous material capable of adsorbing an adsorbate wherein at least one organic group is attached to the carbonaceous material.

The carbonaceous material capable of adsorbing an adsorbate includes, but is not limited to, activated carbon, carbon black, or other carbonaceous material obtained by the pyrolysis of cellulosic, fuel oil, polymeric, or other precursors. This includes carbonaceous material which is a waste product or by-product. Preferably, the carbonaceous material is activated carbon or carbon black capable of adsorbing an adsorbate. Commercial examples of carbon black include, but are not limited to, Black Pearls® 2000 carbon black, Black Pearls® 430 carbon black, Black Pearls® 900 carbon black, and Black Pearls® 120 carbon black, all available from Cabot Corporation. Commercial examples of activated carbon include Darco S51, available from Norit; Sorbonorit 3, available from Norit; and BPL activated carbon from Calgon. The carbonaceous material modified by the procedures described herein may be a microporous or mesoporous activated carbon in granular or pellet form; a carbon black of different structures in fluffy or pelleted form; or any other carbonaceous material whose applicability to this invention is apparent to those skilled in the art, such as carbon fibers or carbon cloth. The choice of carbonaceous material used eventually depends on a variety of different factors, including the application for which it is intended. Each of these types of carbonaceous material has the ability to adsorb at least one adsorbate. A variety of BET surface areas, micropore volumes, and total pore volumes are available depending on the desired end use of the carbonaceous material.

Carbonaceous materials include, but are not limited to, material obtained by the compaction of small carbon particles and other finely divided forms of carbon as long as the carbon has the ability to adsorb at least one adsorbate and is capable of being chemically modified in accordance with the present invention.

The carbonaceous material described above is then modified by the attachment of an organic group to the carbonaceous material. Preferred processes for attaching an organic group to a carbonaceous material are described in detail in U.S. patent application Ser. Nos. 08/356,660, now abandoned; Ser. No. 08/572,525, now U.S. Pat. No. 5,851,280; Ser. No. 08/356,459, now U.S. Pat. No. 5,559,169; and Ser. No. 08/356,653, now U.S. Pat. No. 5,554,739, all incorporated in their entirety by reference herein. These processes can be preferably used in preparing the modified carbon adsorbents of the present invention and permit the attachment of an organic group to the carbonaceous material via a chemical reaction. As indicated above, the organic group attached to the carbonaceous material is one preferably capable of increasing the adsorption capacity of the carbonaceous material.

A preferred process for attaching an organic group to the carbonaceous materials involves the reaction of at least one diazonium salt with a carbonaceous material in the absence of an externally applied current sufficient to reduce the diazonium salt. That is, the reaction between the diazonium salt and the carbonaceous material proceeds without an external source of electrons sufficient to reduce the diazonium salt. Mixtures of different diazonium salts may be used. This process can be carried out under a variety of reaction conditions and in any type of reaction medium, including both protic and aprotic solvent systems or slurries.

In another preferred process, at least one diazonium salt reacts with a carbonaceous material in a protic reaction medium. Mixtures of different diazonium salts may be used in this process. This process can also be carried out under a variety of reaction conditions.

Preferably, in both processes, the diazonium salt is formed in situ. If desired, in either process, the modified carbonaceous material can be isolated and dried by means known in the art. Furthermore, the modified carbonaceous material can be treated to remove impurities by known techniques. The various preferred embodiments of these processes are discussed below.

The processes can be carried out under a wide variety of conditions and in general are not limited by any particular condition. The reaction conditions must be such that the particular diazonium salt is sufficiently stable to allow it to react with the carbonaceous material. Thus, the processes can be carried out under reaction conditions where the diazonium salt is short lived. The reaction between the diazonium salt and the carbonaceous material occurs, for example, over a wide range of pH and temperature. The processes can be carried out at acidic, neutral, and basic pH. Preferably, the pH ranges from about 1 to 9. The reaction temperature may preferably range from 0° C. to 100° C.

Diazonium salts, as known in the art, may be formed for example by the reaction of primary amines with aqueous solutions of nitrous acid. A general discussion of diazonium salts and methods for their preparation is found in Morrison and Boyd, *Organic Chemistry*, 5th Ed., pp. 973–983, (Allyn and Bacon, Inc. 1987) and March, *Advanced Organic Chemistry: Reactions, Mechanisms and Structures*, 4th Ed., (Wiley, 1992). According to this invention, a diazonium salt is an organic compound having one or more diazonium groups.

The diazonium salt may be prepared prior to reaction with the carbonaceous material or, more preferably, generated in situ using techniques known in the art. In situ generation also allows the use of unstable diazonium salts such as alkyl diazonium salts and avoids unnecessary handling or manipulation of the diazonium salt. In particularly preferred processes, both the nitrous acid and the diazonium salt are generated in situ.

A diazonium salt, as is known in the art, may be generated by reacting a primary amine, a nitrite and an acid. The nitrite may be any metal nitrite, preferably lithium nitrite, sodium nitrite, potassium nitrite, or zinc nitrite, or any organic nitrite such as for example isoamylnitrite or ethylnitrite. The acid may be any acid, inorganic or organic, which is effective in the generation of the diazonium salt. Preferred acids include nitric acid, $HNO_3$, hydrochloric acid, HCl, and sulfuric acid, $H_2SO_4$.

The diazonium salt may also be generated by reacting the primary amine with an aqueous solution of nitrogen dioxide. The aqueous solution of nitrogen dioxide, $NO_2/H_2O$, provides the nitrous acid needed to generate the diazonium salt.

Generating the diazonium salt in the presence of excess HCl may be less preferred than other alternatives because HCl is corrosive to stainless steel. Generation of the diazonium salt with $NO_2/H_2O$ has the additional advantage of being less corrosive to stainless steel or other metals commonly used for reaction vessels. Generation using $H_2SO_4/NaNO_2$ or $HNO_3/NaNO_2$ are also relatively non-corrosive.

In general, generating a diazonium salt from a primary amine, a nitrite, and an acid requires two equivalents of acid based on the amount of amine used. In an in situ process, the diazonium salt can be generated using one equivalent of the acid. When the primary amine contains a strong acid group, adding a separate acid may not be necessary. The acid group or groups of the primary amine can supply one or both of the needed equivalents of acid. When the primary amine contains a strong acid group, preferably either no additional acid or up to one equivalent of additional acid is added to a process of the invention to generate the diazonium salt in situ. A slight excess of additional acid may be used. One example of such a primary amine is para-aminobenzenesulfonic acid (sulfanilic acid).

In general, diazonium salts are thermally unstable. They are typically prepared in solution at low temperatures, such as 0–5° C., and used without isolation of the salt. Heating solutions of some diazonium salts may liberate nitrogen and form either the corresponding alcohols in acidic media or the organic free radicals in basic media.

However, the diazonium salt need only be sufficiently stable to allow reaction with the carbonaceous material. Thus, the processes can be carried out with some diazonium salts otherwise considered to be unstable and subject to decomposition. Some decomposition processes may compete with the reaction between the carbonaceous material and the diazonium salt and may reduce the total number of organic groups attached to the carbonaceous material. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

Reagents can be added to form the diazonium salt in situ, to a suspension of carbonaceous material in the reaction medium, for example, water. Thus, a carbonaceous material suspension to be used may already contain one or more reagents to generate the diazonium salt and the process accomplished by adding the remaining reagents.

Reactions to form a diazonium salt are compatible with a large variety of functional groups commonly found on organic compounds. Thus, only the availability of a diazonium salt for reaction with a carbonaceous material limits the processes of the invention.

The processes can be carried out in any reaction medium which allows the reaction between the diazonium salt and the carbonaceous material to proceed. Preferably, the reaction medium is a solvent-based system. The solvent may be a protic solvent, an aprotic solvent, or a mixture of solvents. Protic solvents are solvents, like water or methanol, containing a hydrogen attached to an oxygen or nitrogen and thus are sufficiently acidic to form hydrogen bonds. Aprotic solvents are solvents which do not contain an acidic hydrogen as defined above. Aprotic solvents include, for example, solvents such as hexanes, tetrahydrofuran (THF), acetonitrile, and benzonitrile. For a discussion of protic and aprotic solvents see Morrison and Boyd, *Organic Chemistry*, 5th Ed., pp. 228–231, (Allyn and Bacon, Inc. 1987).

The processes are preferably carried out in a protic reaction medium, that is, in a protic solvent alone or a mixture of solvents which contains at least one protic solvent. Preferred protic media include, but are not limited to water, aqueous media containing water and other solvents, alcohols, and any media containing an alcohol, or mixtures of such media.

The reaction between a diazonium salt and a carbonaceous material can take place with any type of carbonaceous material, for example, in finely divided state or pelleted form. In one embodiment designed to reduce production costs, the reaction occurs during a process for forming carbonaceous material pellets. For example, a carbonaceous material product of the invention can be prepared in a dry drum by spraying a solution or slurry of a diazonium salt onto a carbonaceous material. Alternatively, the carbonaceous material product can be prepared by pelletizing a carbonaceous material in the presence of a solvent system, such as water, containing the diazonium salt or the reagents to generate the diazonium salt in situ. Aqueous solvent systems are preferred.

In general, the processes produce inorganic by-products, such as salts. In some end uses, such as those discussed below, these by-products may be undesirable. Several possible ways to produce a carbonaceous material product without unwanted inorganic by-products or salts are as follows:

First, the diazonium salt can be purified before use by removing the unwanted inorganic by-product using means known in the art. Second, the diazonium salt can be generated with the use of an organic nitrite as the diazotization agent yielding the corresponding alcohol rather than an inorganic salt. Third, when the diazonium salt is generated from an amine having an acid group and aqueous $NO_2$, no inorganic salts are formed. Other ways may be known to those of skill in the art.

In addition to the inorganic by-products, the process may also produce organic by-products. They can be removed, for example, by extraction with organic solvents. Other ways of obtaining products without unwarranted organic by-products may be known to those of skill in the art, and include washing or removal of ions by reverse osmosis.

The reaction between a diazonium salt and a carbonaceous material forms a carbonaceous material product having an organic group attached to the carbonaceous material. The diazonium salt may contain the organic group to be attached to the carbonaceous material. It may be possible to produce the carbonaceous material products of this invention by other means known to those skilled in the art.

The organic group may be an aliphatic group, a cyclic organic group, or an organic compound having an aliphatic portion and a cyclic portion. As discussed above, the diazonium salt employed can be derived from a primary amine having one of these groups and being capable of forming, even transiently, a diazonium salt. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyl, thienyl, thiazolyl, furyl, indolyl, and the like). As the steric hinderance of a substituted organic group increases, the number of organic groups attached to the carbonaceous material from the reaction between the diazonium salt and the carbonaceous material may be diminished.

When the organic group is substituted, it may contain any functional group compatible with the formation of a diazonium salt. Functional groups include, but are not limited to, R, OR, COR, COOR, OCOR, carboxylate salts such as COOLi, COONa, COOK, COO$^-$NR$_4^+$, halogen, CN, NR$_2$, SO$_3$H, sulfonate salts such as SO$_3$Li, SO$_3$Na, SO$_3$K, SO$_3^-$NR$_4^+$, OSO$_3$H, OSO$_3^-$ salts, NR(COR), CONR$_2$, NO$_2$, PO$_3$H$_2$, phosphonate salts such as PO$_3$HNa and PO$_3$Na$_2$, phosphate salts such as OPO$_3$HNa and OPO$_3$Na$_2$, N=NR, NR$_3^+$X$^-$, PR$_3^+$X, S$_k$R, SSO$_3$H, SSO$_3^-$ salts, SO$_2$NRR', SO$_2$SR, SNRR', SNQ, SO$_2$NQ, CO$_2$NQ, S-(1,4-piperazinediyl)-SR, 2-(1,3-dithianyl) 2-(1,3-dithiolanyl), SOR, and SO$_2$R. R and R', which can be the same or different, are independently hydrogen, branched or unbranched C$_1$–C$_{20}$ substituted or unsubstituted, saturated or unsaturated hydrocarbon, e.g., alkyl, alkenyl, alkynyl, substituted or unsubstituted aryl, substituted or unsubstituted heteroaryl, substituted or unsubstituted alkylaryl, or substituted or unsubstituted arylalkyl. The integer k ranges from 1–8 and preferably from 2–4. The anion X$^-$ is a halide or an anion derived from a mineral or organic acid. Q is (CH$_2$)$_w$, (CH$_2$)$_x$O(CH$_2$)$_x$, (CH$_2$)$_x$NR(CH$_2$)$_z$, or (CH$_2$)$_x$S(CH$_2$)$_z$, where w is an integer from 2 to 6 and x and z are integers from 1 to 6. In the above formula, specific examples of R and R' are NH$_2$—C$_6$H$_4$—, CH$_2$CH$_2$—C$_6$H$_4$—NH$_2$, CH$_2$—C$_6$H$_4$—NH$_2$, and C$_6$H$_5$.

Another example of an organic group is an aromatic group of the formula A$_y$Ar—, which corresponds to a primary amine of the formula A$_y$ArNH$_2$. In this formula, the variables have the following meanings: Ar is an aromatic radical such as an aryl or heteroaryl group. Ar can be selected from the group consisting of phenyl, naphthyl, anthracenyl, phenanthrenyl, biphenyl, pyridinyl, benzothiadiazolyl, and benzothiazolyl; A is a substituent on the aromatic radical independently selected from a preferred functional group described above or A is a linear, branched or cyclic hydrocarbon radical (preferably containing 1 to 20 carbon atoms), unsubstituted or substituted with one or more of those functional groups; and y is an integer from 1 to the total number of —CH radicals in the aromatic radical. For instance, y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl.

Another set of organic groups which may be attached to the carbonaceous material are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such an organic group has a) an aromatic group or a C$_1$–C$_{12}$ alkyl group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group or the C$_1$–C$_{12}$ alkyl group of the organic group is directly attached to the carbonaceous material. The aromatic group may be further substituted or unsubstituted, for example, with alkyl groups. The organic group can be a phenyl or a naphthyl group and the acidic group is a sulfonic acid group, a sulfinic acid group, a phosphonic acid group, or a carboxylic acid group. Examples of these acidic groups and their salts are discussed above. The organic group can be a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof. An example of a substituted sulfophenyl group is hydroxysulfophenyl group or a salt thereof.

Specific organic groups having an ionizable functional group forming an anion (and their corresponding primary amines for use in a process according to the invention) are p-sulfophenyl (p-sulfanilic acid), 4hydroxy-3-sulfophenyl (2-hydroxy-5-aminobenzenesulfonic acid), and 2-sulfoethyl (2-aminoethanesulfonic acid).

Amines represent examples of ionizable functional groups that form cationic groups. For example, amines may be protonated to form ammonium groups in acidic media. Preferably, an organic group having an amine substituent has a pKb of less than 5. Quaternary ammonium groups (—NR$_3^+$) and quaternary phosphonium groups (—PR$_3^+$) also represent examples of cationic groups. The organic group can contain an aromatic group such as a phenyl or a naphthyl group and a quaternary ammonium or a quaternary phosphonium group. The aromatic group is preferably directly attached to the carbonaceous material. Quaternized cyclic amines, and even quaternized aromatic amines, can also be used as the organic group. Thus, N-substituted pyridinium compounds, such as N-methyl-pyridyl, can be used in this regard. Examples of organic groups include, but are not limited to, (C$_5$H$_4$N)C$_2$H$_5^+$X$^-$, C$_6$H$_4$(NC$_5$H$_5$)$^+$X$^-$, C$_6$H$_4$COCH$_2$N(CH$_3$)$_3^+$X$^-$, C$_6$H$_4$COCH$_2$(NC$_5$H$_5$)$^+$X$^-$, (C$_5$H$_4$N)CH$_3^+$X$^-$, and C$_6$H$_4$CH$_2$N(CH$_3$)$_3^+$X$^-$, which X$^-$ is a halide or an anion derived from a mineral or organic acid.

Aromatic sulfides encompass another group of organic groups. These aromatic sulfides can be represented by the formulas Ar(CH$_2$)$_q$S$_k$(CH$_2$)$_r$Ar' or A—(CH$_2$)$_q$S$_k$(CH$_2$)$_r$Ar" wherein Ar and Ar' are independently substituted or unsubstituted arylene or heteroarylene groups, Ar" is an aryl or heteroaryl group, k is 1 to 8 and q and r are 0–4. Substituted aryl groups would include substituted alkylaryl groups. Examples of arylene groups include phenylene groups, particularly p-phenylene groups, or benzothiazolylene groups. Aryl groups include phenyl, naphthyl and benzothiazolyl. The number of sulfurs present, defined by k preferably ranges from 2 to 4. Examples of carbonaceous material products are those having an attached aromatic sulfide organic group of the formula —($C_6H_4$)—$S_k$—($C_6H_4$)—, where k is an integer from 1 to 8, and more preferably where k ranges from 2 to 4. Other examples of aromatic sulfide groups are bis-para-($C_6H_4$)—$S_2$—($C_6H_4$)— and para-($C_6H_4$)—$S_2$—($C_6H_5$). The diazonium salts of these aromatic sulfide groups may be conveniently prepared from their corresponding primary amines, $H_2N$—Ar—$S_k$—Ar'—$NH_2$ or $H_2N$—Ar—$S_k$—Ar". Groups include dithiodi-4,1-phenylene, tetrathiodi-4,1-phenylene, phenyldithiophenylene, dithiodi-4,1-(3-chlorophenylene), —(4—$C_6H_4$)—S—S—(2—$C_7H_4NS$), —(4—$C_6H_4$)—S—S—(4—$C_6H_4$)—OH, —6—(2—$C_7H_3NS$)—SH, —(4—$C_6H_4$)—$CH_2CH_2$—S—S—$CH_2$—(4—$C_6H_4$)—, —(4—$C_6H_4$)—$CH_2CH_2$—S—S—S—$CH_2CH_2$—(4—$C_6H_4$)—, —(2—$C_6H_4$)—S—S—(2—$C_6H_4$)—, —(3—$C_6H_4$)—S—S—(3—$C_6H_4$)—, —6—($C_6H_3N_2S$), —6—(2—$C_7H_3NS$)—S—NRR' where RR' is —$CH_2CH_2OCH_2CH_2$—, —(4—$C_6H_4$)—S—S—S—S—(4—$C_6H_4$)—, —(4—$C_6H_4$)—CH=$CH_2$, —(4—$C_6H_4$)—S—$SO_3H$, —(4—$C_6H_4$)—$SO_2NH$—(4—$C_6H_4$)—S—S—(4—$C_6H_4$)—$NHSO_2$—(4—$C_6H_4$)—, —6—(2—$C_7H_3NS$)—S—S—2—(6—$C_7H_3NS$)—, —(4—$C_6H_4$)—S—$CH_2$—(4—$C_6H_4$)—, —(4—$C_6H_4$)—$SO_2$—S—(4—$C_6H_4$)—, —(4—$C_6H_4$)—$CH_2$—$CH_2$—(4—$C_6H_4$)—, —(3—$C_6H_4$)—$CH_2$—S—$CH_2$—(3—$C_6H_4$)—, —(4—$C_6H_4$)—$CH_2$—S—S—$CH_2$—(4—$C_6H_4$)—, —(3—$C_6H_4$)—$CH_2$—S—S—$CH_2$—(3—$C_6H_4$)—, —(4—$C_6H_4$)—S—NRR', where RR' is —$CH_2CH_2OCH_2CH_2$—, —(4—$C_6H_4$)—$SO_2NH$—$CH_2CH_2$—S—S—$CH_2CH_2$—$NHSO_2$—(4—$C_6H_4$)—, —(4—$C_6H_4$)—2—(1,3-dithinyl), and —(4—$C_6H_4$)—S—(1,4)-piperizinediyl)—S—4—$C_6H_4$)—.

Another set of organic groups which may be attached to the carbonaceous material are organic groups having an aminophenyl, such as ($C_6H_4$)—$NH_2$, ($C_6H_4$)—$CH_2$—($C_6H_4$)—$NH_2$, ($C_6H_4$)—$SO_2$—($C_6H_4$)—$NH_2$.

In Any one or more of these organic groups, after attachment to the carbonaceous material which permits adsorption, and preferably an increase in the adsorption capacity of the carbonaceous material may be used in the present invention.

Preferably, the organic group attached to the carbonaceous material is an acid or base or a salt of an acid or base, and specific examples include phenyl or naphthyl groups having substituents like sulfonic acid, and carboxylic acid. Quaternary ammonium can also be used. Most preferred organic groups attached to the carbonaceous material are ($C_6H_4$)—$SO_3^-Na^+$, ($C_6H_4$)—$SO_3^-K^+$, ($C_6H_4$)—$SO3^-Li^+$, and the like. Generally, an acid-organic group attachment will be useful in adsorbing basic adsorbates while a base-type organic group attachment will be useful in adsorbing acidic adsorbates.

A combination of different organic groups is possible. For instance, it is within the bounds of the present invention to attach more than one type of organic group to the same carbonaceous material or use a combination of carbonaceous materials, wherein some of the carbonaceous material has been modified with one organic group and another portion of the carbonaceous material has been modified with a different organic group. Varying degrees of modification are also possible, such as low weight percent or surface area modification, or a high weight percent or surface area modification. Also, mixtures of modified carbonaceous material and unmodified carbonaceous material can be used.

Preferably, the modified carbonaceous materials of the present invention, especially when the attached organic group is a phenyl or naphthyl group having substituents like sulfonic acid, carboxylic acid, or quaternary ammonium or salts thereof, can be directly analogous to polymeric ion exchange resins. These types of carbonaceous materials of the present invention can have one or more of the following properties as compared to conventional polymeric ion exchangers:

a) higher temperature stability;
b) greater resistance to swelling; and
c) greater mechanical strength without adversely affecting uptake kinetics.

Furthermore, the modified carbonaceous materials of the present invention, besides being used as adsorbents, can also be used in separations ranging from water treatment to metals separation/recovery, ion exchange, catalysis, and the like. An additional advantage of an adsorbent possessing exchangeable groups as described above is that it confers on the material the ability to be further surface modified using ion exchange procedures.

With respect to the adsorbates, any adsorbate capable of being adsorbed by one or more of the modified carbonaceous materials of the present invention is contemplated to be within the bounds of the present invention. Examples include, but are not limited to, polar species such as water, ammonia, mercaptans, sulfur dioxide, and hydrogen sulfide. By "polar species," it is understood that this is a species whose electronic structure is not symmetrical. This includes molecules that possess dipole moments, for example $H_2O$ and $NH_3$; and/or molecules that possess quadrupole moments, such as $CO_2$ and molecules that possess unsaturated pi bonds ($\pi$), such as alkenes, alkynes, and other organic and inorganic compounds with double and triple bonds. Non-polar species such as argon, oxygen, methane, and the like can also be adsorbed with the appropriate modified carbonaceous materials of the present invention. In view of the description provided in this application, those skilled in the art will be able to determine which organic groups need to be attached to the carbonaceous materials in order to achieve the most effective adsorption affinity or increase in adsorption, depending upon the adsorbate and the adsorption processes involved.

By developing an adsorbent composition containing a modified carbonaceous material capable of adsorbing an adsorbate, selectivity for a particular adsorbate can be enhanced. Using the proper modified carbonaceous material, one can selectively adsorb particular species from a multi-component mixture. In other words, modifying the carbonaceous material to create the adsorbent composition of the present invention can decrease adsorption affinity for one component in order to maximize the adsorption affinity of another component which will maximize separation of the second component from the first component Furthermore, by increasing adsorption of polar species, this further results in the relatively decreased adsorption of nonpolar species which improves selectivity. Further, the carbonaceous material can be modified in such a manner as to add a hydrophobic group to "disable" the oxygen functionalities on the surface of the carbonaceous material to increase the selectivity for the adsorption of nonpolar species.

The adsorbate can be in a liquid phase or in the gaseous or vapor phase, depending upon the needs and desires of the user. Certain adsorbates can be more efficiently adsorbed from the vapor or gaseous phases than from the liquid phase or vice versa, and the modified carbonaceous materials of the present invention are effective in adsorption from either phase.

One advantage of the present invention is to modify the surface of an activated carbon or carbon black adsorbent extensively, without damaging the structure or making the adsorbent more friable. For instance, a carbonaceous material can be surface modified based on the present invention with exchangeable sodium cations attached to the surface. This is very useful from the point of view of substituting different ions to alter the chemistry of the surface.

The beneficial effect of using the modified carbonaceous materials of the present invention for the purpose of adsorption can be demonstrated by comparing the adsorption isotherms of an adsorbate on an unmodified carbonaceous adsorbent and the same carbonaceous adsorbent modified in accordance with the present invention.

The present invention will be further clarified by the following examples, which are intended to be purely exemplary of the present invention.

EXAMPLES

The effectiveness of the surface modification of exemplary carbonaceous material was determined by comparing the adsorption isotherms of various adsorbates on the unmodified carbonaceous materials, with adsorption isotherms on the carbonaceous materials modified in accordance with the present invention. Adsorbates used were water and $CO_2$, but other adsorbates could also be used.

Example 1

Pellets of Black Pearls® 430 carbon black and Darco S51 activated carbon from Norit were surface-modified using the following procedure:

Surface Modification of Black Pearls® 430 Carbon Black

A dispersion of 5 ml of water dilutable phenol-formaldehyde thermosetting resin (Schenectady International, Schenectady, N.Y.) in 50 mL of water was mixed with 50 g of Black Pearls® 430 carbon black (available from Cabot Corp., Boston, Mass.). The mixture was pressed in 1 g portions using a 0.25 inch stainless steel die at a pressure of 5000 psi. The pellets were heated under flowing argon at 110° C. for one hour and at 135° C. for one hour to cure the resin. The temperature was then raised under flowing argon at 20° C./min until a temperature of 650° C. was reached. The temperature was then held at 650° C. for three hours and cooled under flowing argon. The pellets were then crushed into pieces about 1 mm by 2 mm.

An aqueous solution of 0.81 g of sodium nitrite in about 1 g of water was added to a mixture of 16.8 g of the carbon black granules, 2.04 g of sulfanilic acid, and 50 g of water that was stirring at 84° C. After stirring for two hours, the resulting material was dried in an oven at 65° C.

Surface Modification of Activated Carbon

An aqueous solution of 30.5 g of sodium nitrite in about 100 g of water was added to a boiling mixture of 130 g of DARCO S51 activated carbon (available from Norit), 76.5 g of sulfanilic acid, and 1300 g of water. After stirring for 15 minutes, the heating was discontinued and the mixture was allowed to cool to room temperature with stirring. The resulting material was dried overnight in an oven at 50° C.

Ion Exchange

The surface modified carbons were washed with a large amount of deionized water and dried. The material thus obtained was in the sodium form. Further modification of the carbon into potassium and lithium forms was carried out by ion exchange using 2M solutions of KOH and LiOH, respectively. The ion-exchanged material was washed thoroughly and dried. Adsorption experiments were carried out on the washed, dried materials.

The surface areas of the unmodified and surface modified carbon materials are shown in Table 1 below. Surface areas were calculated from nitrogen (77 K) adsorption data using the BET formalism (S. J. Gregg and K. S. W. Sing, in "Adsorption, Surface Area, and Porosity" Academic Press, 1982). The adsorption experiments were carried out on an ASAP 2000 automated instrument, manufactured by Micromeritics Corp.

TABLE 1

Surface Area and Pore Volumes of Unmodified and Surface Modified Materials

| Sample ID | BET Surface Area, $m^2/g$ | Pore Volume, $cm^3/g$ |
| --- | --- | --- |
| BP 430 pellets, unmodified | 99 | 0.518 |
| BP 430, modified, washed | 92 | 0.49 |
| Darco S51 | 694 | 0.809 |
| Darco S51, modified, washed | 141.3 | 0.279 |

Figure 2:
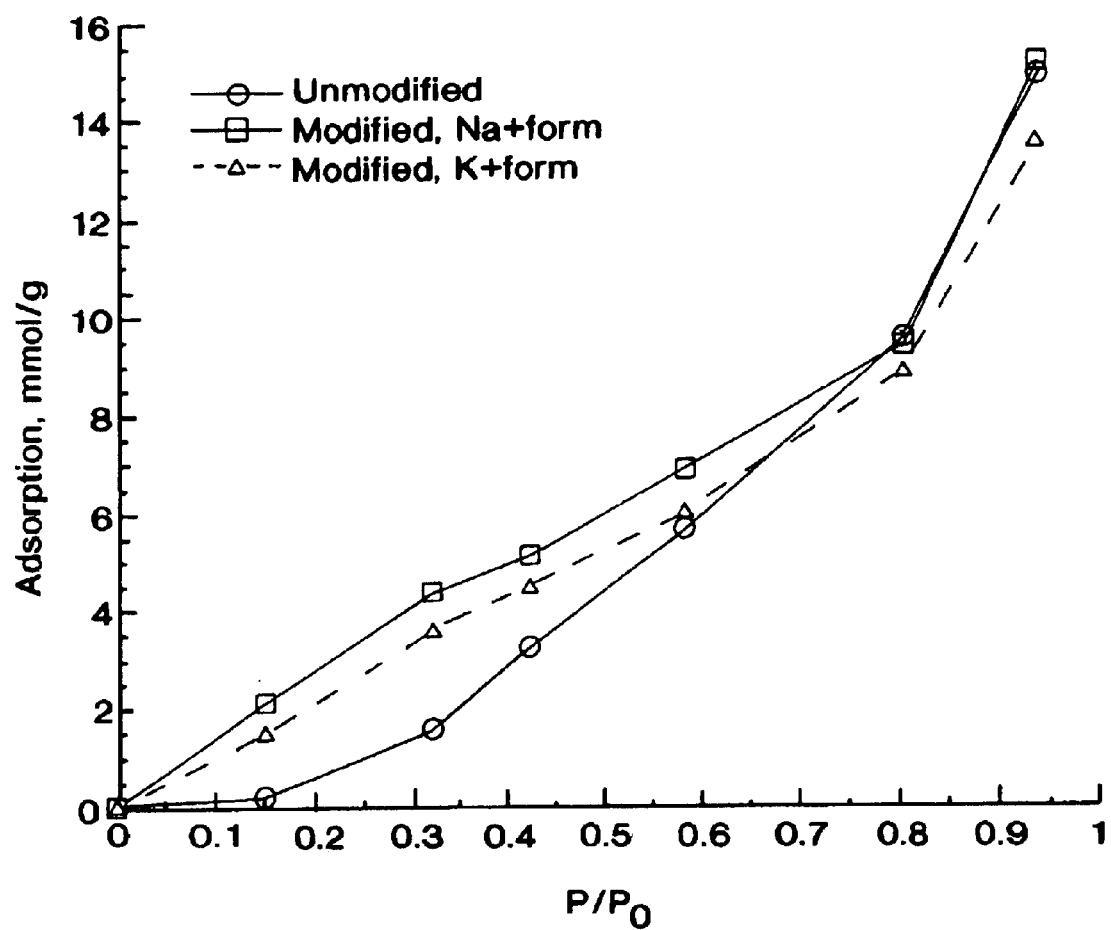
FIG. 2 is a graph plotting the amount of water adsorption on modified and unmodified activated carbon.

While the activated carbon lost some surface area and pore volume after the surface modification treatment, both the carbon black and the activated carbon underwent an increase in adsorption capacity per unit surface area as a result of the surface modification. The loss of any surface area and pore volume may be mitigated by pre-treating the carbonaceous material with immiscible organic solvent, like heptane. The results from adsorption of water vapor at 298 K on the unmodified and modified material are shown in FIG. 1 (carbon black) and. FIG. 2 (activated carbon). The water adsorption experiments were carried out by a batch technique that involved equilibrating the sample with water vapor at a constant relative humidity, in a sealed cell. The constant relative humidities were attained by using saturated salt solutions, which have known relative humidities above their surface.

Figure 3:
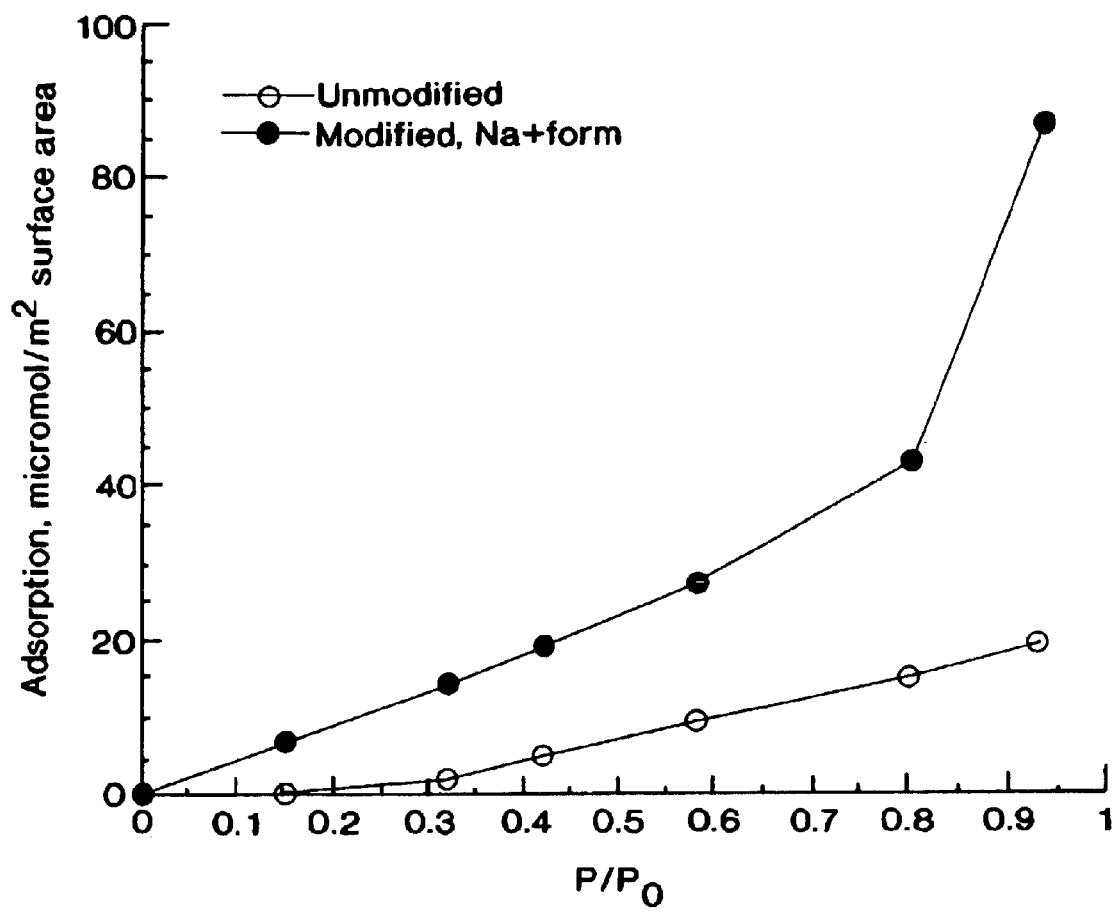
FIG. 3 is a graph plotting the amount of water adsorption on modified and unmodified carbon black per unit surface area.
Figure 4:
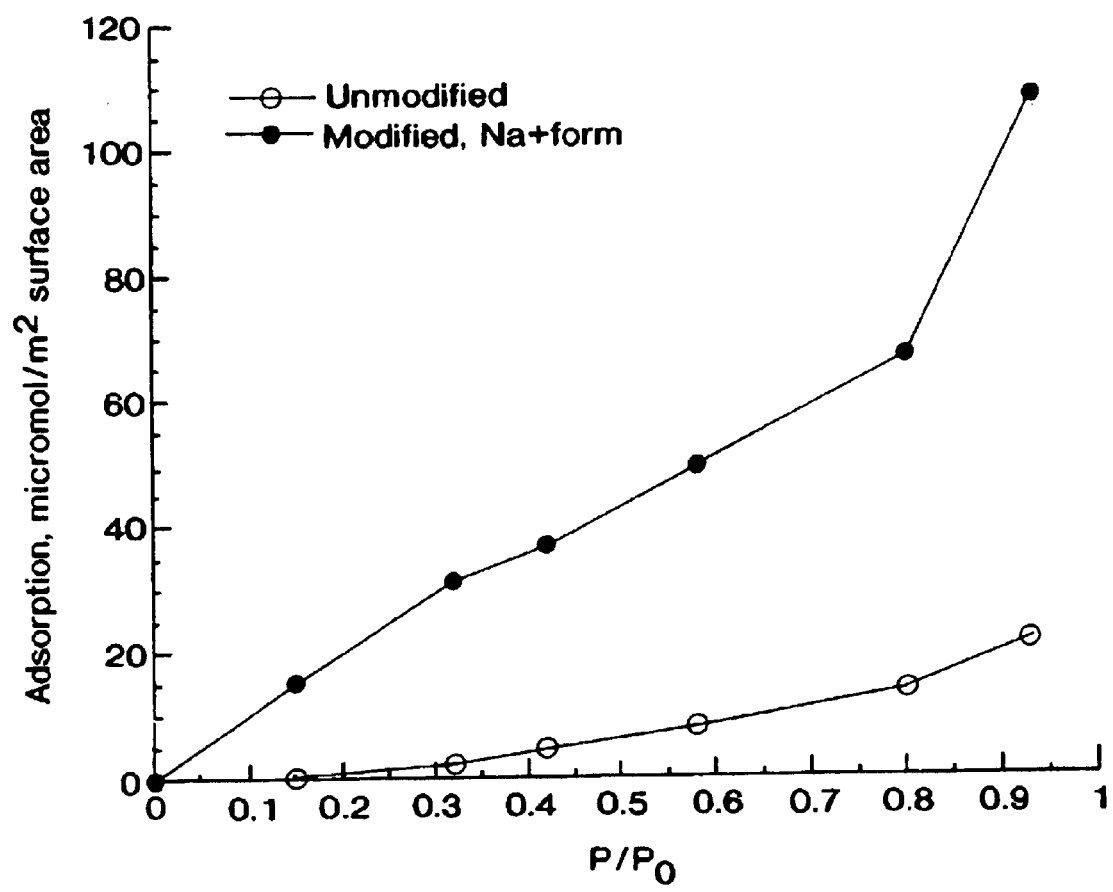
FIG. 4 is a graph plotting the amount of water adsorption on modified and unmodified activated carbon per unit surface area.

Both the activated carbon and carbon black contained $Na^+$ ions on the surface after the surface modification was carried out. The $Na^+$ ions can be substituted by other ions using standard ion exchange procedures (e.g., see Ion Exchange, by F. Helfferich, McGraw-Hill, 1962). The water adsorption isotherms for the surface-modified material with $Na^+$ ions on the surface, as well as the other ionic forms derived by ion exchange, are shown in FIGS. 1 and 2. The adsorption isotherms show the quantity of water vapor adsorbed, per gram of adsorbent, as a function of the relative pressure of water vapor. FIGS. 3 and 4 show the same data normalized by the BET surface area of the materials. It is clear that the adsorption capacities per unit area of the carbon black, Black Pearls® 430 carbon black and the Darco S51 carbon black, are considerably enhanced by the surface modification described in this invention. In addition, the shape of the water adsorption isotherm is changed as a result of the surface modification (concave upward, to linear or convex upward).

Figure 5:
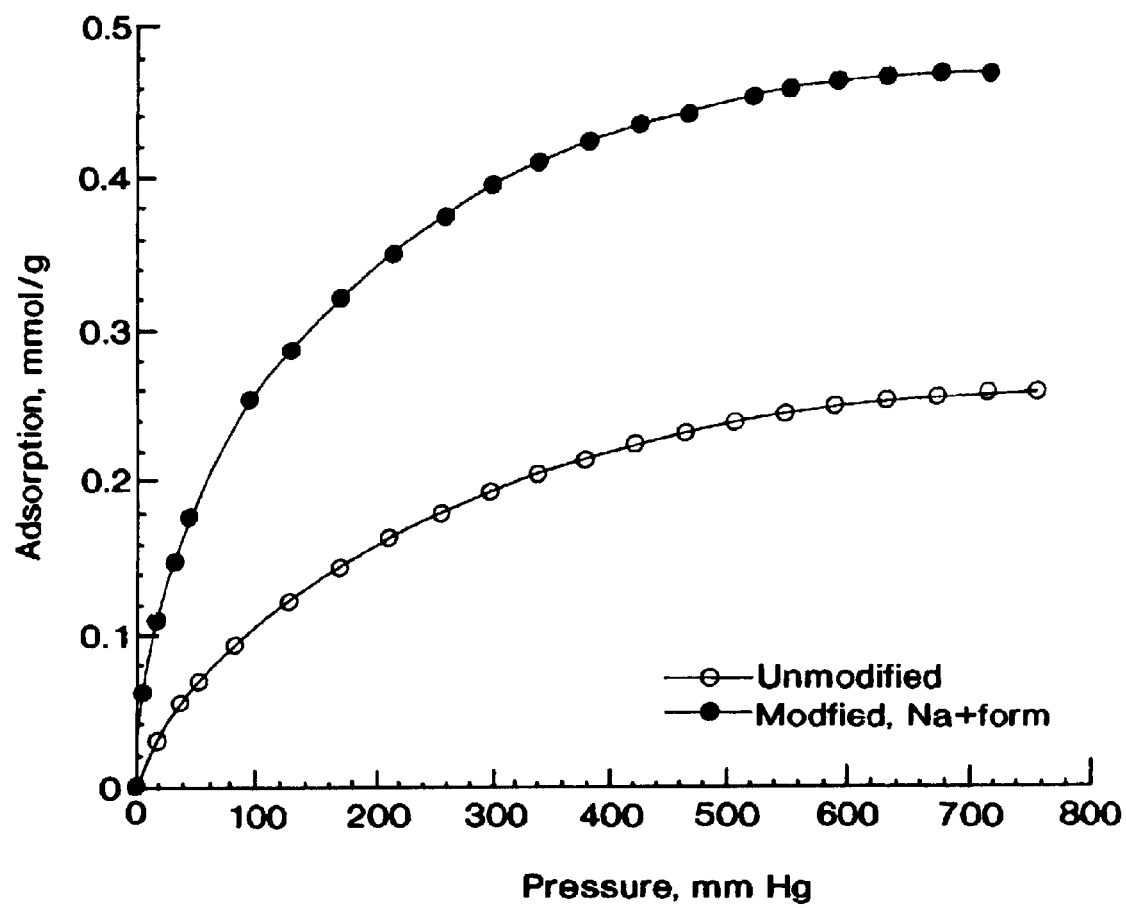
FIG. 5 is a graph plotting the amount of $CO_2$ adsorption on modified and unmodified carbon black at 273 K.

The surface modification technique of the present invention may affect the adsorption of gases like $CO_2$ as well, which possesses a quadrupole movement. FIG. 5 shows the adsorption isotherm of $CO_2$ from the gas phase at 273 K on the same unmodified and modified Black Pearls® 430 carbon black. Adsorption of CO2 was carried out on an ASAP 2000 automated adsorption system manufactured by Micromeritics Corp. The figure shows the quantity of $CO_2$ adsorbed as a function of the $CO_2$ pressure. Clearly, the adsorption of $CO_2$ is enhanced by the carbon surface modification technique described in this invention.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method to adsorb an adsorbate comprising contacting said adsorbate with a modified carbonaceous material capable of adsorbing said adsorbate wherein said modified carbonaceous material comprises at least one organic group attached to a carbonaceous material, wherein said organic group comprises an aromatic group or a $C_1$–$C_{12}$ alkyl group directly attached to the carbonaceous material, with the proviso that said carbonaceous material is not activated carbon, wherein said carbonaceous material is obtained by the pyrolysis of fell oil or polymeric precursors.

2. The method of claim 1, wherein said organic group is $(C_6H_4)$—$SO_3^-Na^+$, $(C_6H_4)$—$SO_3^-L^+$, or $(C_6H_4)SO_3^-K^+$.

3. The method of claim 1, wherein said organic group is p-$C_6H_4SO_2NH_2$ or —$C_6H_4NH_2$.

4. The method of claim 1, wherein said organic group is hydrophilic.

5. The method of claim 1, wherein said adsorbate is polar.

6. The method of claim 1, wherein said adsorbate is water, ammonia, carbon dioxide, hydrogen sulfide, argon, oxygen, or methane.

7. The method of claim 6, wherein said adsorbate is water.

8. A The method of claim 1, wherein said organic group is substituted with the functional group having the formula R, OR, COR, COOR, OCOR, a carboxylate salt, halogen, CN, $NR_2$, $SO_3H$, a sulfonate salt, $OSO_3H$, a $OSO_3^-$ salt, NR(COR), $CONR_2$, $NO_2$, $PO_3H_2$, a phosphonate salt, a phosphate salt, N=NR, $NR_3^+X^-$, $PR_3^+X^-$, $S_kR$, $SSO_3H$, a $SSO_3^-$ salt, $SO_2NRR'$, $SO_2SR$, SNRR', SNQ, $SO_2NQ$, $CO_2NQ$, S-(1,4-piperazinediyl)-SR, 2-(1,3-dithianyl) 2-(1,3-dithiolanyl), SOR, or $SO_2R$, wherein R and R', which are the same or different, are independently hydrogen, branched or unbranched $C_1$–$C_{20}$ substituted or unsubstituted, saturated or unsaturated hydrocarbon, k is an integer ranging from 1–8, anion $X^-$ is a halide or an anion derived from a mineral or organic acid, Q is $(CH_2)_w$, $(CH_2)_xO(CH_2)_2$, $(CH_2)_xNR(CH_2)_2$, or $(CH_2)_xS(CH_2)_z$, where w is an integer from 2 to 6 and x and z are integers from 1 to 6, wherein said hydrocarbon is alkyl, alkenyl, alkynyl, substituted or unsubstituted aryl, substituted or unsubstituted heteroaryl, substituted or unsubstituted alkylaryl, or substituted or unsubstituted arylalkyl.

9. The method of claim 1, wherein said organic group is an aromatic group having the formula $A_yAr$—, wherein Ar is an aromatic radical and A is a substituent on the aromatic radical, and y is an integer from 1 to the total number of —CH radicals in the aromatic radical.

10. The method of claim 9, wherein the substituent A is a linear, branched, or cyclic hydrocarbon radical.

11. The method of claim 9, wherein the substituent A is a linear, branched, or cyclic hydrocarbon containing 1 to 20 carbon atoms.

12. The method of claim 9, wherein said Ar is phenyl, naphthyl, anthracenyl, phenanthrenyl, biphenyl, pyridinyl, benzothiadiazolyl, or benzothiazolyl.

13. The method of claim 9, wherein the substituent A is a linear, branched, or cyclic hydrocarbon containing 1 to 20 carbon atoms and Ar is phenyl, naphthyl, anthracenyl, phenanthrenyl, biphenyl, pyridinyl, benzothiadiazolyl, or benzothiazolyl.

14. A The method of claim 1, wherein said organic group is a $C_1$–$C_{12}$ alkyl group having at least one acidic group having a pKa of less than 11 or at least one salt of an acidic group having a pKa of less than 11, or a mixture thereof.

15. The method of claim 9, wherein there is more than one type of organic group attached to said carbonaceous material.

16. The method of claim 8, wherein there is more than one type of organic group attached to said carbonaceous material.

17. The method of claim 9, wherein some of the carbonaceous material has been modified with one organic group and another portion of the carbonaceous material has been modified with a different organic group.

* * * * *